United States Patent [19]

Hogan et al.

[11] Patent Number: 4,641,127
[45] Date of Patent: Feb. 3, 1987

[54] SECURITY AND FIRE PROTECTION SYSTEM

[76] Inventors: Dennis R. Hogan, 310-7th, Snohomish, Wash. 98290; John K. Wright, 1695 Arthur, North Bend, Oreg. 97459

[21] Appl. No.: 696,467

[22] Filed: Jan. 30, 1985

[51] Int. Cl.$^4$ .................. G08B 19/00; G08B 1/00
[52] U.S. Cl. ..................... 379/40; 340/539; 340/531; 340/521; 379/42; 379/45
[58] Field of Search .............. 340/521, 539, 531, 527, 340/533, 534, 536, 538, 500, 506; 179/5 R, 5 P

[56] References Cited

U.S. PATENT DOCUMENTS

| | | | |
|---|---|---|---|
| 3,299,211 | 1/1967 | Avery et al. | 179/5 |
| 3,492,426 | 1/1970 | Foreman et al. | 179/5 |
| 3,707,708 | 12/1972 | Dan | 179/5 |
| 3,883,695 | 5/1975 | Bickel et al. | 179/5 R |
| 3,914,692 | 10/1975 | Seaborn, Jr. | 340/539 |
| 3,925,763 | 12/1975 | Wadhwani et al. | 340/539 |
| 4,086,434 | 4/1978 | Bocchi | 179/5 R |
| 4,092,643 | 5/1978 | Stolarczyk | 340/539 |
| 4,137,429 | 1/1979 | Stockdale | 179/5 R |
| 4,141,007 | 2/1979 | Kavasilios et al. | 340/500 |
| 4,249,036 | 2/1981 | Kutzki | 179/5 |
| 4,258,357 | 3/1981 | Browell | 340/506 |
| 4,273,961 | 6/1981 | Blank et al. | 179/5 R |
| 4,332,980 | 6/1982 | Reynolds et al. | 179/2 |
| 4,390,750 | 6/1983 | Bartelink | 179/5 |
| 4,417,100 | 11/1983 | Carlson et al. | 179/5 R |
| 4,450,320 | 5/1984 | Ostermann et al. | 179/5 R |
| 4,465,904 | 8/1984 | Gottsegen et al. | 179/5 R |
| 4,493,947 | 1/1985 | Loveless | 179/5 R |
| 4,523,184 | 6/1985 | Abel | 340/539 |

Primary Examiner—Donnie L. Crosland
Attorney, Agent, or Firm—Christensen, O'Connor, Johnson & Kindness

[57] ABSTRACT

A plurality of smoke (or heat) detector-transmitter units (17, 19) and/or a plurality of intrusion detector-transmitter units (21) are mounted at various positions throughout a premises to be protected (11a, 11b, 11c ...). The units are wireless and transmit a signal whose code relates to whether the unit is a smoke (or heat) detector-transmitter unit (17, 19) or an intrusion detector-transmitter unit (21). Also located on the protected premises (11a, 11b, 11c ...) is a receiver-alarm unit (23) that receives and decodes the signals produced by the smoke (or heat) detector-transmitter and intrusion detector-transmitter units (17, 19, 21). Upon receipt of a coded signal, the receiver-alarm unit (23) automatically seizes the telephone line (13a, 13b, 13c ...) running from the protected premises (11a, 11b, 11c ...) to a central location (15) and produces an "operator" dial signal. The receiver-alarm unit (23) also produces an alarm signal whose tone is related to whether the received coded signal was produced by a smoke (or heat) detector-transmitter unit (17, 19) or an intrusion detector-transmitter unit (21). When the central location (15) responds to the "operator" dial signal, the alarm tone is applied to the telephone line (13a, 13b, 13c ...). Thus, the operator hears the alarm, as well as sees the premises telephone number, which is produced at the operator's console (29) by the automatic number identification (ANI) circuitry of the central location (15). Thus, the operator has all of the information needed to respond in a suitable matter, i.e., call the fire or police department. The receiver-alarm unit (21) includes a manually operated delay switch (67) that can be used by a subscriber to delay the sending of a "fire" alarm tone to the central location (15) while a potential fire situation is being evaluated. The receiver-alarm unit (21) also includes a manually operable send immediate switch (69) that in combination with an activate switch (70) or a received fire alarm signal can be used to cause the telephone line to be seized and the fire alarm tone sent immediately.

8 Claims, 6 Drawing Figures

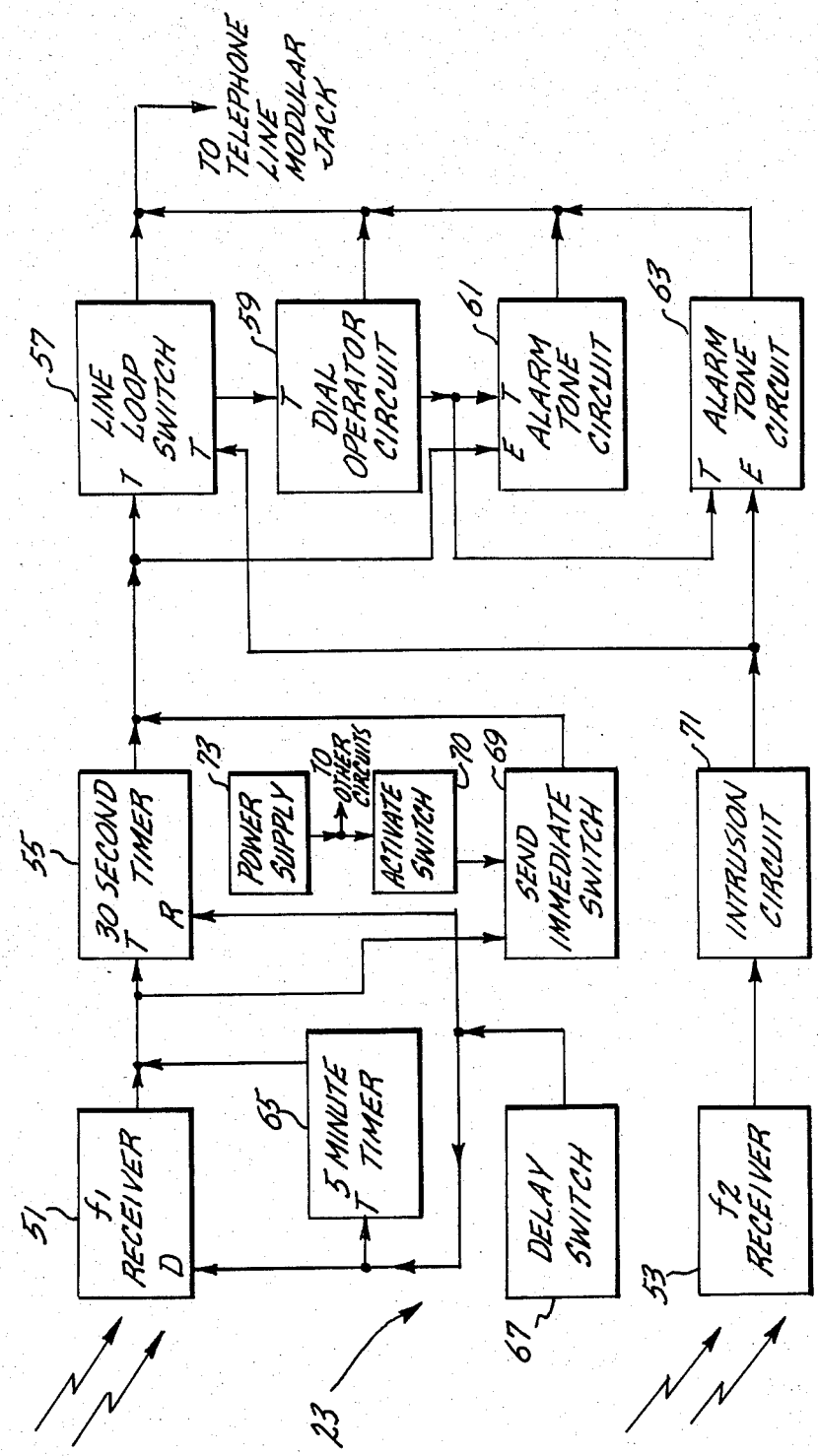

SECURITY AND FIRE PROTECTION SYSTEM

TECHNICAL AREA

This invention relates to security and fire protection systems for hotel and motel rooms, homes, and other premises and, more particularly, fire and security protection systems that send an alarm signal to an off-premises monitoring station.

BACKGROUND OF THE INVENTION

In the past, a variety of devices and systems directed to protecting hotel and motel rooms, homes and other premises from fire and intruder damage have been proposed. They vary from uncomplicated localized (e.g., on-premises) devices, such as smoke or intruder detectors, designed to create only a premises alarm to complex off-premises monitoring systems that "dial" a central monitoring station and transmit an alarm to the station when the monitored condition occurs. Some systems even have dedicated phone lines that carry a continuous signal from the monitored premises to the central station. The absence of the signal indicates that the phone line has been damaged—by being cut, for example.

Intruder on-premises alarms have the disadvantage that they can be easily dismantled by many intruders, such as "professional" thieves. All on-premises alarms (e.g., smoke and heat, as well as intruder) have the disadvantages of requiring: that a person be on or near the premises when the alarm is activated; and, that a person hearing the alarm does not ignore the alarm. Ignoring the alarm by neighbors is a frequent occurrence, particularly when false alarms have occurred in the past.

While the complex off-premises monitoring systems proposed in the past, in general, avoid the disadvantages of on-premises alarms, they have not found widespread acceptance for various reasons. In the past, the primary disadvantage of off-premises monitoring systems has been the expense associated with installing and maintaining such systems. More specifically, in the past, the detectors (intrusion, heat or smoke) of off-premises monitoring systems have been wired to a central unit that sends a signal to the central monitoring station when a condition to be detected occurs. Because such systems have involved substantial wiring at each premises being monitored, they have been expensive to install, particularly when the premises is large and the owner is desirous of having the wires hidden from view. In addition to installation costs, in instances where the system is operated by someone other than the owner of the premises, the system providers charge a fee, normally a monthly fee, to monitor the detectors at the central monitoring station and respond when a monitored condition occurs.

This invention is directed to avoiding the foregoing, and other disadvantages of prior premises protection systems and devices.

SUMMARY OF THE INVENTION

In accordance with this invention, a plurality of detector-transmitter units are mounted at suitable locations about a premise to be protected. The detector-transmitter units are configured to detect heat, smoke or intruders, depending upon the type or types of protection to be provided and the location of a specific detector-transmitter unit. The detector-transmitter units produce and transmit a coded radio frequency signal when they detect the condition they are configured to detect. Also located on the premises is a receiver-alarm unit designed to receive the coded radio frequency signals produced by the detector-transmitter units. Upon receipt of a coded signal, the receiver-alarm unit automatically seizes a telephone line and produces an "operator" dial signal. The receiver-alarm unit also produces an alarm signal whose tone is related to whether the received coded signal is produced by a fire related detector-transmitter unit or an intrusion related detector-transmitter unit. When the operator responds to the "operator" dial signal, the automatic number identification (ANI) circuitry of the switching system causes the calling number to be automatically displayed for the operator. Thus, the operator has all of the information needed to respond in a suitable manner, i.e., call the fire or police department. More specifically, the nature of the tone identifies the nature of the intrustion or fire emergency and the calling number can be used to identify the location of the premises having the emergency. Depending upon the nature of the premises to be protected, i.e., motel or hotel rooms or floors, homes, etc., the operator may be a motel or hotel PBX operator or a Telco central office operator.

In accordance with further aspects of this invention, the receiver-alarm unit includes a manually operable delay that can be used to delay the sending of a "fire" alarm tone to the operator while a potential fire situation is being evaluated. In accordance with still other aspects of this invention, the receiver-alarm unit also includes a manually operable send immediate switch that causes the telephone line to be seized and a fire alarm tone to be sent without delay.

As will be appreciated from the foregoing description, the invention provides a premises protection system that avoids the disadvantages of prior devices and systems of the types described above. Because the system transmits signals to a central monitoring station, i.e., a motel or hotel switchboard, or a Telco central office, it avoids the disadvantages of on-premises detector systems that are tied to local alarms that are often ignored by neighbors. Further, because the detector-transmitter units are designed to transmit radio frequency signals to a related receiver-alarm unit, the expense associated with premise wiring are avoided since radio frequency transmitters and receivers are wireless.

Finally, because the invention takes advantage of the features of a conventional state-of-the-art PBX and Telco central office switching systems, the periodic monitoring fees charged by independent services for operating a central monitoring station are substantially reduced, if not entirely avoided.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 5 is a block diagram of a receiver-alarm unit formed in accordance with the invention suitable for use in the protection system illustrated in FIG. 1; and, FIG. 6 is a block diagram of a receiver suitable for use in the receiver-alarm unit illustrated in FIG. 5.

DESCRIPTION OF THE PREFERRED EMBODIMENT

Figure 1:
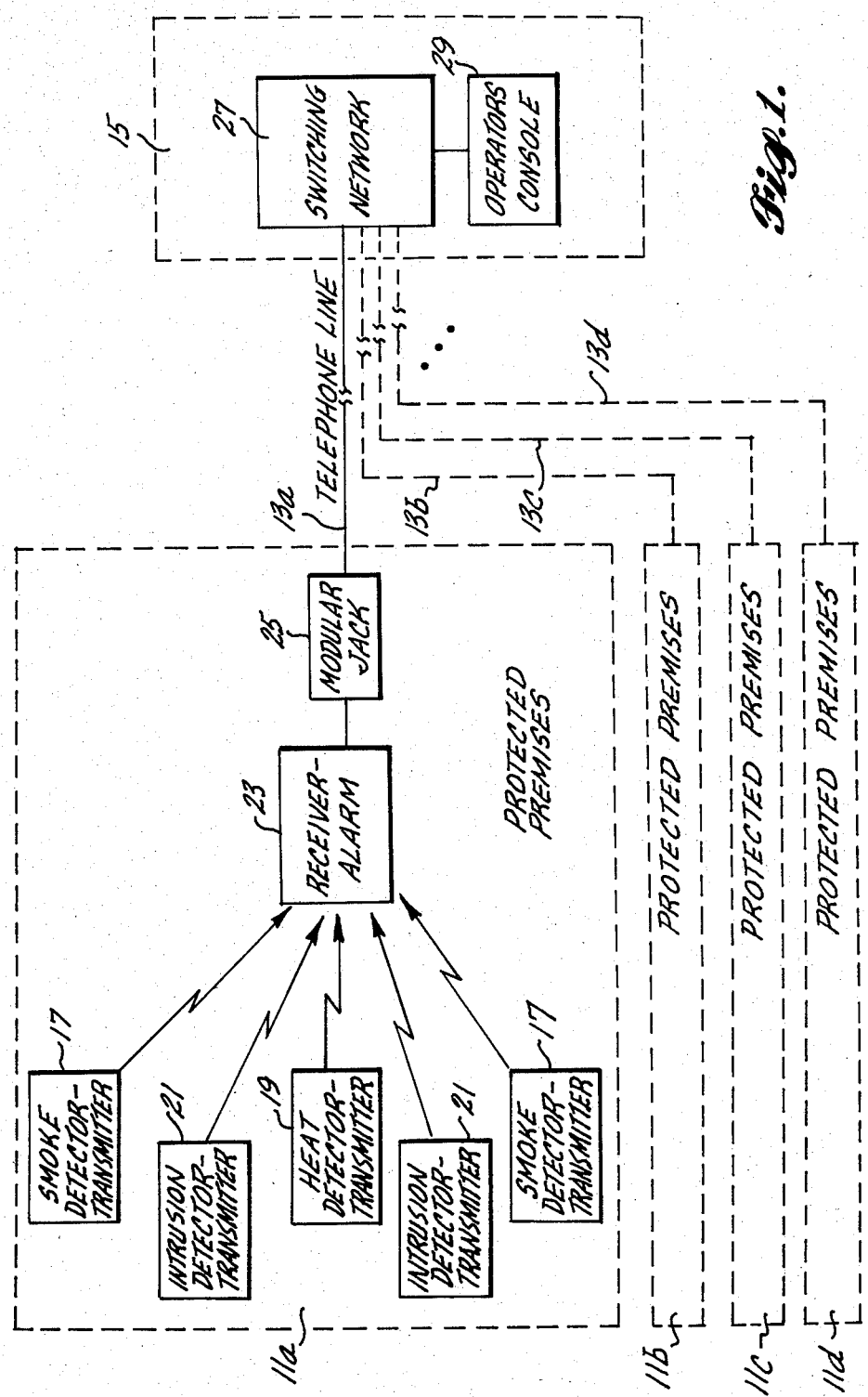
FIG. 1 is a block diagram of a preferred embodiment of a premises security and fire protection system formed in accordance with the invention.

FIG. 1 is a block diagram of a premises security and fire protection system formed in accordance with the invention. Schematically illustrated in FIG. 1 are a plurality of protected premises 11a, 11b, 11c, 11d, etc. Each premises is connected via its own telephone line 13a, 13b, 13c, 13d, etc. to a central location 15. The premises may be motel or hotel rooms or floors. In this instance the central location 15 is the motel or hotel switchboard. Alternatively, the premises may be homes, whereby the central location is a Telco central office. In either case, the central location includes a switching network 27 that connects the premises together or to other switching networks in a conventional manner to provide telephone communication service.

Mounted at suitable positions in each of the protected premises are a plurality of detector-transmitter units 17, 19 and 21. The illustrated detector-transmitter units include one or more smoke detector-transmitter units 17, one or more heat detector-transmitter units 19 and one or more intrusion detector-transmitter units 21 or any combination thereof, i.e., the detector-transmitter units may only include smoke detectors, only heat detectors, only intrusion detectors or any combination thereof. In essence, heat and smoke detectors are different types of "fire" detectors, one designed to detect the smoke and the other designed to detect the heat produced by a fire. As will be better understood from the following description, each of the detector-transmitters includes a detector designed to detect the indicated condition and a transmitter designed to produce and transmit a coded radio frequency signal when the condition is detected. The radio frequency signal transmission is wireless.

Also located on each of the protected premises 11a, 11b, 11c, 11d . . . is a receiver-alarm unit 23. As will also be better understood from the following description, the receiver-alarm unit 23 receives the coded radio frequency signals produced by the detector-transmitter units and, in accordance therewith, contacts the central location 15. In this regard, as illustrated in FIG. 1, the receiver-alarm units of each protected premises are connected via a modular jack 25 to the telephone line 13a, 13b, 13c, 13d . . . running from the premises to the switching network 27 of the central location 15. In addition to being connected to other conventional items, such as other premises telephone lines and transmission lines, the switching network 27 is also connected to an operator's console 29. While not shown, it is to be understood that the premises ends of the telephone lines 13a, 13b, 13c, 13d, etc. are also connected via modular jacks to telephone and/or other devices that communicate over telephones lines.

As will be better understood from the following description, when a receiver-alarm unit receives a coded signal from one of the detector-transmitter units 17, 19 and 21 with which it is associated, the receiver-alarm unit automatically "dials" an "operator" by seizing the telephone line of the protected premises and dialing a zero (0). As soon as the switching network 27 responds to the zero (0), the receiver-alarm unit sends a tone, whose frequency is dependent upon the nature of the detector-transmitter unit that produced the coded signal, to the central location via the seized telephone line.

As is conventional, when a zero (0) is received via a telephone line, the switching network 27 automatically displays the calling telephone number at an operator's console 29 at the same time it connects the operator to the zero (0) calling line. When connected, the operator, of course, hears the tone produced by the receiver-alarm unit 23. Thus, the operator as all of the information needed to respond to the emergency that caused the activation of the receiver-alarm unit, the seizing of the telephone line and the transmission of the zero (0). More specifically, the telephone number uniquely identifies the location of the protected premises. As previously noted, the frequency of the tone defines the nature of the emergency, i.e., the condition sensed by the detector that sent the coded signal to the receiver-alarm unit. After looking up the location or address of the premises (via a computer if necessary), the operator can call the fire department and advise them that a fire is occurring at the protected premises if the tone signal is fire related. Alternatively, if an intrusion detector transmitted the coded signal to the receiver-alarm unit 23, the operator can call the police department (or an internal security agent in the case of a large hotel or motel) and advise them of the intrusion.

As will be readily appreciated from the foregoing description and viewing FIG. 1, a premises security and fire protection system formed in accordance with the invention avoids the disadvantages of prior protection systems of the types described above. Because wireless transmission is used, the protected premises do not have to be wired. Further, because the status of the receiver-alarm unit is monitored at a central location that has other normal duties, the need for a separate central monitoring station is avoided.

Figure 2:
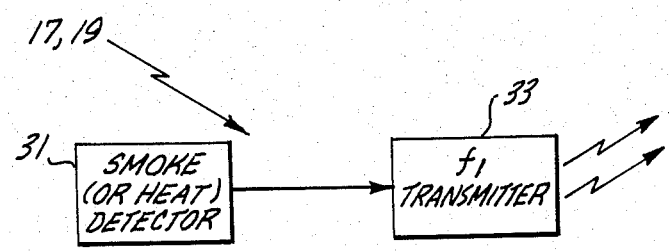
FIG. 2 is a block diagram of a smoke detector-transmitter unit formed in accordance with the invention suitable for use in the protection system illustrated in FIG. 1.

FIG. 2 is a block diagram of a smoke (or heat) detector-transmitter unit suitable for use in the premises security and fire protection system illustrated in FIG. 1. The smoke (or heat) detector unit 17, 19 includes a smoke (or heat) detector 31 and a transmitter 33, identified as an f1 transmitter to distinguish it from the transmitter of the hereinafter described intrusion detector-transmitter unit 21. The smoke (or heat) detector 31 is a conventional battery operated smoke or heat detector. The smoke (or heat) detector 31 is connected to the f1 transmitter 33, which is also battery operated. The f1 transmitter is configured to produce a coded radio frequency signal when the smoke (or heat) detector detects smoke (or heat).

Figure 3:
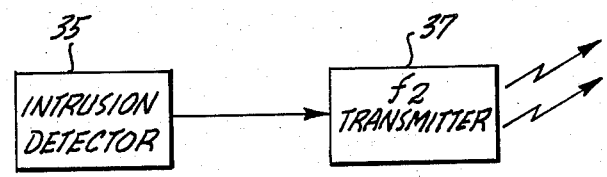
FIG. 3 is a block diagram of an intrusion detector-transmitter unit formed in accordance with the invention suitable for use in the protection system illustrated in FIG. 1.

FIG. 3 is a block diagram of an intrusion detector-transmitter unit 21 suitable for use in the premises security and fire protection system illustrated in FIG. 1 and comprises an intrusion detector 35 and a transmitter 37. The transmitter 37 is designated the f2 transmitter to distinguish it from the f1 transmitter 33 of the smoke (or heat) detector-transmitter unit illustrated in FIG. 2. In essence, the f1 and f2 transmitters are the same, except that they transmit different codes when activated. The codes may simply be different carrier frequencies. Or signals transmitted by the f1 and f2 transmitters may be the same, with the coding being accomplished by modulating the signals in some suitable manner, such as pulse code modulation, frequency modulation, etc. The intrusion detector 35, which is battery operated, may take on a wide variety of forms. For example, the intrusion detector can be a magnetic intrusion detector that detects when a door or window is opened by an intruder entering the protected premises. Alternatively, the intrusion detector can be an ultrasonic, optic or infrared intrusion detector designed to detect the movement of an intruder through a predetermined area of the premises. Regardless of its form, the output of the intrusion detector is connected to the f2 transmitter 37 such that the intrusion detector activates or triggers the f2 transmitter 37 when the intrusion detector 35 detects an intrusion. The f2 transmitter 37 is also battery operated and, like the f1 transmitter, transmits a coded signal when triggered.

Figure 4:
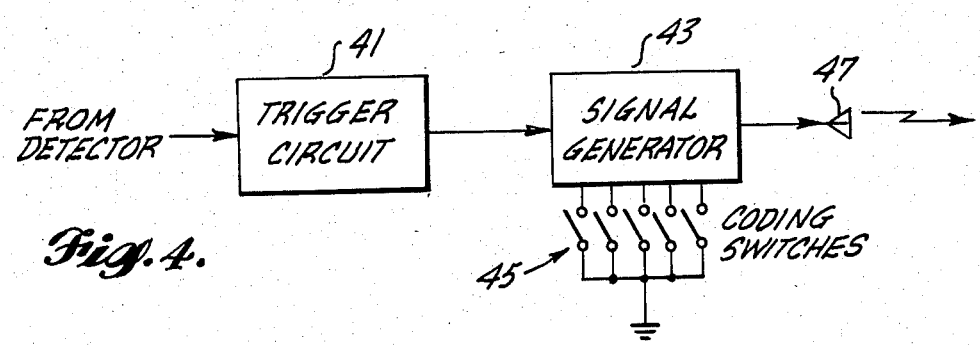
FIG. 4 is a block diagram of a transmitter suitable for use in the smoke detector-transmitter and intrusion detector-transmitter units illustrated in FIGS. 2 and 3.

FIG. 4 is a block diagram of a suitable f1 or f2 transmitter. The transmitter illustrated in FIG. 4 comprises: a trigger circuit 41; a signal generator 43; a plurality of coding switches 45; and, an antenna 47. The output of the related detector is connected at the input of the trigger circuit 41. The output of the trigger circuit 41 is connected to the input of the signal generator 43. The trigger circuit may take on a variety of forms depending upon the nature of the detector and the signal generator. In essence, the trigger circuit 41 conditions or converts the information received from the detector into a form suitable for enabling the signal generator 43 such that the signal generator continues to generate a coded signal until reset once the denoted condition has been detected. It is this signal that forms the f1 or f2 signal. Thus, the nature, e.g., code, of the signal produced by the signal generator is determined by the setting of the coding switches 45. More specifically, the coding switches 45 are connected to the signal generator. Preferably, the coding switches are in the form of DIP switches and the signal generator is a related integrated circuit. The setting of the control switches determines the f1/f2 code of the signal produced by the signal generator 43. As discussed above, the f1/f2 code may be simply the frequency of the signal produced by the signal generator, or the encoding a fixed frequency signal. The output of the signal generator 43 is connected to the antenna 47.

A block diagram of a receiver-alarm unit 23 formed in accordance with the invention is illustrated in FIG. 5 and comprises: two receivers designated f1 receiver 51 and f2 receiver 53; a 30-second timer 55; a line loop switch 57; a dial operator circuit 59; first and second alarm tone circuits 61 and 63; a five-minute timer 65; a delay switch 67; a send immediate switch 69; an activate switch 70; an intrusion circuit 71; and, a power supply 73. The output of the f1 receiver is connected to the trigger input of the 30-second timer 55 and the output of the 30-second timer 55 is connected to the input of the line loop switch 57 and to an enable input of the first alarm tone circuit 61. The output of the line loop switch 57 is connected to the telephone line modular jack of the protected premises, as illustrated in FIG. 1 and previously described. The line loop switch 57 is also connected to a trigger input of the dial operator circuit 59. The output of the dial operator circuit 59 is also connected to the telephone line modular jack. Further, the dial operator circuit 59 is connected to the trigger inputs of the first and second alarm tone circuit 61 and 63.

The delay switch 67 is connected to the reset input of the 30-second timer 55, a disable input of the receiver 51 and a trigger input of the five-minute timer 65. The send immediate switch 69 is connected to the trigger input of the line loop switch 57 and to the enable input of the first alarm tone circuit 61. The send immediate switch has two inputs at least one of which must be producing a signal for the closure of the send immediate switch to actuate the circuits to which it is connected, as described below. One input of the send immediate switch 69 is connected to the output of the f1 receiver 51. The second input of the send immediate switch 69 is connected to the output of the activate switch 70. The activate switch 70 is connected to the power bus, which is powered by the power supply 73. The power bus also supplies power to any of the other circuits of the receiver-alarm unit requiring electrical power. In order to avoid unnecessarily complicating FIG. 5 power connections are not illustrated.

The output of the f2 receiver 53 is connected to the input of the intrusion circuit 71. The intrusion circuit conditions the output of the f2 receiver and applies the conditioned signal to the enable input of the second alarm tone circuit 63 and a trigger input of the line loop switch 57. The output of the first and second alarm tone circuits 61 and 63 are both connected to the telephone line modular jack.

The f1 receiver 51 is configured to respond to the coded signals produced by the f1 transmitters 33, i.e., the transmitter associated with the smoke (or heat) detectors 31. When the f1 receiver receives a signal from an f1 transmitter 33, the f1 receiver produces an output signal that triggers the 30-second timer 55. After 30 seconds, unless reset, the 30-second timer produces an output signal that: (a) triggers the line loop switch 57; and, (b) enables the first alarm tone circuit 61. The line loop switch 57 in a conventional manner seizes the telephone line running from the protected premises housing the actuated f1 receiver to the switching network of the central location. The line loop switch also triggers the dial operator circuit 59. In a conventional manner, the dial operator circuit 59 produces a zero (0) signal that "calls" the operator. After the central location switching network responds to the zero (0), the dial operator circuit 59 triggers the first alarm tone circuit 61. Thereafter, the alarm tone circuit 61 produces a tone that is peculiar to a smoke (or heat) detected condition, i.e., a fire alarm tone.

While not shown, preferably, the output of the f1 receiver 51 also produces an alarm control signal that triggers an on-premises alarm when the f1 receiver 51 receives a coded signal from an f1 transmitter 33. As a result, a person on or near the protected premises has the 30 seconds provided by the 30-second timer to evaluate the smoke (or heat) detected situation before the line to the central location is seized and the first alarm tone circuit transmits a fire alarm tone. If this period of time is insufficient for a potential fire condition to be evaluated, the on-premises person can actuate the delay switch 67. Actuation of the delay switch 67 resets the 30-second timer 55 and triggers the five-minute timer 65. The delay switch 67 also disables the receiver 51 so it cannot apply a second trigger signal to the 30-second timer 55. After the five-minute timer 65 times out, it applies a second trigger signal to the 30-second timer 55, which causes the sequence of operations set forth above, i.e., line seizing by the line loop switch 57, dialing of a zero (0) by the dial operator circuit 59 and production of an alarm tone by the first alarm tone circuit 61. Thus, if the on-premises person's evaluation is that the central office should be alerted to call the fire department, a signal is automatically sent after the five-minute and 30-second timers time out. If the five-minute evaluation interval is insufficient, the delay switch 67 can be actuated a second time to cause a second five-minute delay.

If a fire condition occurs that does not trigger a smoke (or heat) detector, or if the evaluation of the potential fire situation by the on-premises person indicates that the central locations should be alerted to contact the fire department even before the 30-second timer times out, the send immediate switch 69 is actuated. The send immediate switch 69 bi-passes the 30-second timer and immediately triggers the line loop switch 57. The line loop switch in turn seizes the telephone line and triggers the dial operator circuit, causing the transmission of a zero (0) signal to the central location. Thereafter, as described above, the dial operator circuit 59 triggers the first alarm tone circuit 61, causing an alarm tone to be transmitted to the central location. Still further, if the five-minute timer has been actuated and the on-premises person decides that the central location should be alerted, or if such a decision is reached before a fire or smoke detector even sends a signal to the f1 receiver, the activate switch can be closed and the send immediate switch activated, causing the sequence of events described above. Preferably, both the activate switch 70 and the send immediate switch 69 are push button switches formed such that each depression changes the switch from one state (e.g., open or closed) to the other state (e.g., closed or open). Further, preferably, both switches include visual indicators that are energized when the related switch contacts are closed.

The f2 receiver is conditioned to respond to a coded signal produced by an f2 transmitter 37. As noted above, the intrusion circuit converts the output of the f2 receiver into a form suitable for triggering the line loop switch 57 and enabling the second alarm tone circuit 63. As a result, when an intrusion detector detects an intruder and transmits a suitably coded signal, the f2 receiver produces a signal that causes line loop switch 57 to be triggered. As with the fire situation, the line loop switch 57: (a) seizes the telephone line running from the protected premises to the central location; and, (b) triggers the dial operator circuit 59. The dial operator circuit 59 dials a zero (0) and triggers the second alarm tone circuit 63, which was previously enabled by the intrusion circuit 71. As a result, an intrusion alarm tone is transmitted to the central location causing the operator in this instance to call the police department rather than the fire department.

Figure 6:
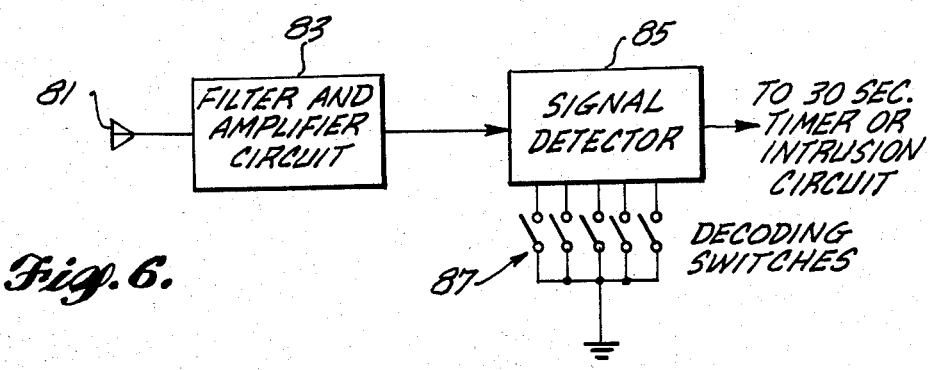

FIG. 6 is a block diagram illustrating a suitable f1 or f2 receiver 51 or 53. The receiver illustrated in FIG. 6 comprises: an antenna 81; a filter and amplifier circuit 83; a signal detector 85; and, a plurality of decoding switches 87. The output of the antenna 81 is connected to the input of the filter and amplifier circuit 83 and the output of the filter and amplifier circuit is connected to the signal input of the signal detector 85. The filter and amplifier circuit filters and amplifies signals received by the antenna 81. The filtered and amplified signals are analyzed by the signal detector. The decoding switches 87 are set to determine the code to which the signal detector 85 will respond. That is, when the signal detector receives a suitably coded signal, whose nature is determined by the setting of the decoding switches 87, the signal detector produces an output signal, which is applied to the 30-second timer 55 or the intrusion circuit 71, as illustrated in FIG. 5 and previously described. As with the signal generator, depending upon how the invention is implemented, the signal detector could be a simple detector designed to respond to a particular tone or the signal detector could be a decoder designed to respond to a coded tone. Regardless of the nature of the decoding function, preferably, the signal detector 85, like the signal generator 43 is an integrated circuit and the coding switches are in the form of DIP switches.

While a preferred embodiment of the invention has been illustrated and described, it will be appreciated that various changes can be made therein without departing from the spirit and scope of the invention. For example, if desired, protected premises may be only fire protected or only intrusion detected, rather than fire and intrusion detected. Further, time periods other than 30-second and five-minute time periods can be utilized in a receiver-alarm unit used in a premises security and fire protection system formed in accordance with the invention. Alternatively, both or one of the timers can be eliminated, if desired. Similarly, the delay switch (along with the five-minute timer) and/or the send immediate switch, can be eliminated. Hence, the invention can be practiced otherwise than as specifically described herein.

The embodiments of the invention in which an exclusive property or privilege is claimed are defined as follows:

1. A premises protection system for protecting premises connected to the central office of a telco system by telephone lines against fire and/or intrusion, said premises protection system comprising:
   (a) a telco central office comprising:
      (1) an operator's console including display means;
      (2) a switching network for selectively connecting telephone lines together, to other central offices and to said operator's console; and,
      (3) automatic number identification circuitry connected to the display means of said operator's console for causing said display means to display the number of a calling telephone when said switching network connects a telephone line carrying an operator dial signal to said operator's console;
   (b) a plurality of telephone lines, one end of each of said telephone lines connected to said switching network of said telco central office; and,
   (c) a plurality of protected premises subsystems, one located at each premise to be protected, each of said premise to be protected also being located at the other end of one of said plurality of telephone lines, each of said protected premises subsystems comprising:
      (1) a plurality of detector-transmitter units positioned about each of said protected premises, each of said detector-transmitter units including:
         (i) a detector for detecting a predetermined condition and conditioning an output signal when said condition is detected; and,
         (ii) a transmitter connected to said detector for receiving said conditioned output signal and producing a wireless radio frequency signal when said conditioned output signal is received; and, (2) a receiver-alarm unit for:
  (i) receiving said wireless radio frequency signals produced by said transmitters of said detector-transmitter units;
  (ii) seizing the telephone line running from said protected premises to said switching network of said telco central office when a wireless radio frequency signal produced by the transmitters of one of said plurality of detector-transmitter units is received;
  (iii) initially transmitting an operator dial signal to said telco central office via said seized telephone line; and,
  (iv) subsequently transmitting an alarm tone signal to said telco central office via said seized telephone line.

2. A premises protection system as claimed in claim 1, wherein said plurality of detector-transmitter units includes at least one fire detector-transmitter unit and at least one intrusion detector-transmitter unit and wherein the wireless radio frequency signal produced by said transmitters connected to said at least one fire detector-transmitter unit is different than the wireless radio-frequency signal transmitted by said transmitters connected to said at least one intrusion detector-transmitter unit.

3. A premises protection system as claimed in claim 2, wherein said receiver-alarm unit includes first and second receivers, said first receiver adapted to receive the wireless radio-frequency signal produced by the transmitters connected to said at least one fire detector-transmitter unit and said second receiver adapted to receive the signal produced by the transmitter connected to said at least one intrusion detector-transmitter unit.

4. A premises protection system as claimed in claim 3, including a first interval timer connected at the output of said first receiver so as to be triggered by the output of said first receiver, the output of said first interval timer connected to control the seizure of a telephone line running from said protected premises to said central location when said first interval timer times out after being triggered.

5. A premises protection system as claimed in claim 4, including a delay switch and a second interval timer, the output of said delay switch connected to trigger said second interval timer and reset said first interval timer, the output of said second interval timer connected to trigger said first interval timer when said second interval timer times out after being triggered.

6. A premises protection system as claimed in claim 5, wherein said receiver-alarm unit includes a send immediate switch connected to cause: (i) the immediate seizure of said telephone line running from said protected premises to said telco central office; (ii) the production of an operator dial signal; and, (iii) the production of an alarm tone signal.

7. A premises protection system as claimed in claim 6, wherein said receiver-alarm unit includes first and second alarm tone circuits, said first alarm tone circuit connected to be actuated by the output of said first interval timer and the second alarm tone circuit connected to be actuated by the output of said second receiver.

8. A premises protection system as claimed in claim 7, wherein:
  said receiver-alarm unit includes: (a) a line loop switch connected to the output of said first interval timer and to the output of said second receiver; and
  (b) a dial operator circuit connected at the output of said line loop switch;
  first and second alarm tone circuits are (a) both connected to the output of said dial operator circuit to be triggered by said dial operator circuit, and (b) each connected to the output of one of said first interval timer and said second receiver, to be enabled by said first interval timer and said second receiver; and
  the output of said line loop switch, said dial operator circuit and said first and second alarm tone circuits are connected to the telephone line running from said protected premises to said central location.

* * * * *